April 19, 1960
P. M. HEINMILLER ET AL
2,933,329
TOWING ASSEMBLY FOR TRAILERS
Filed June 9, 1958
2 Sheets-Sheet 1
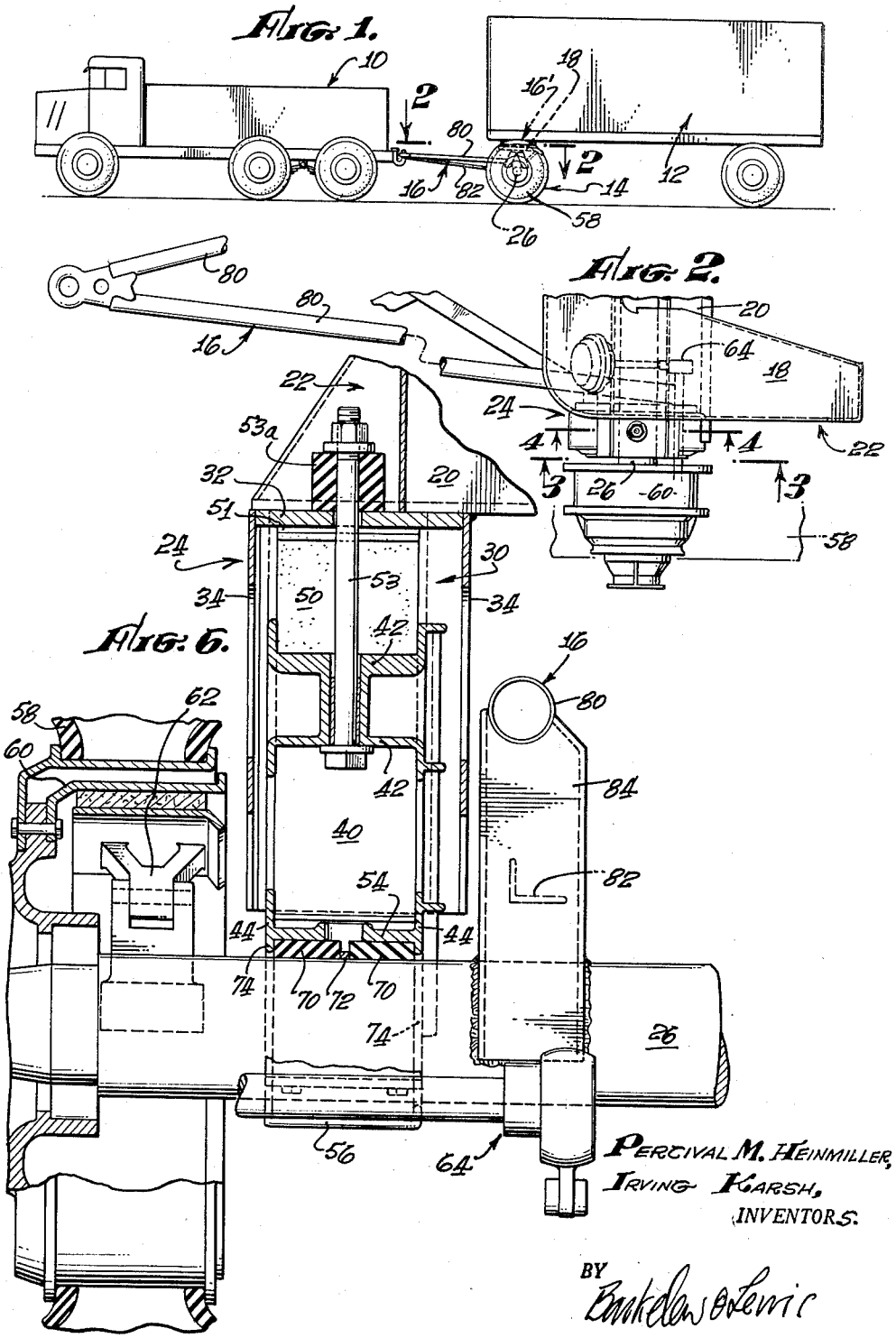
Percival M. Heinmiller,
Irving Karsh,
INVENTORS.
BY

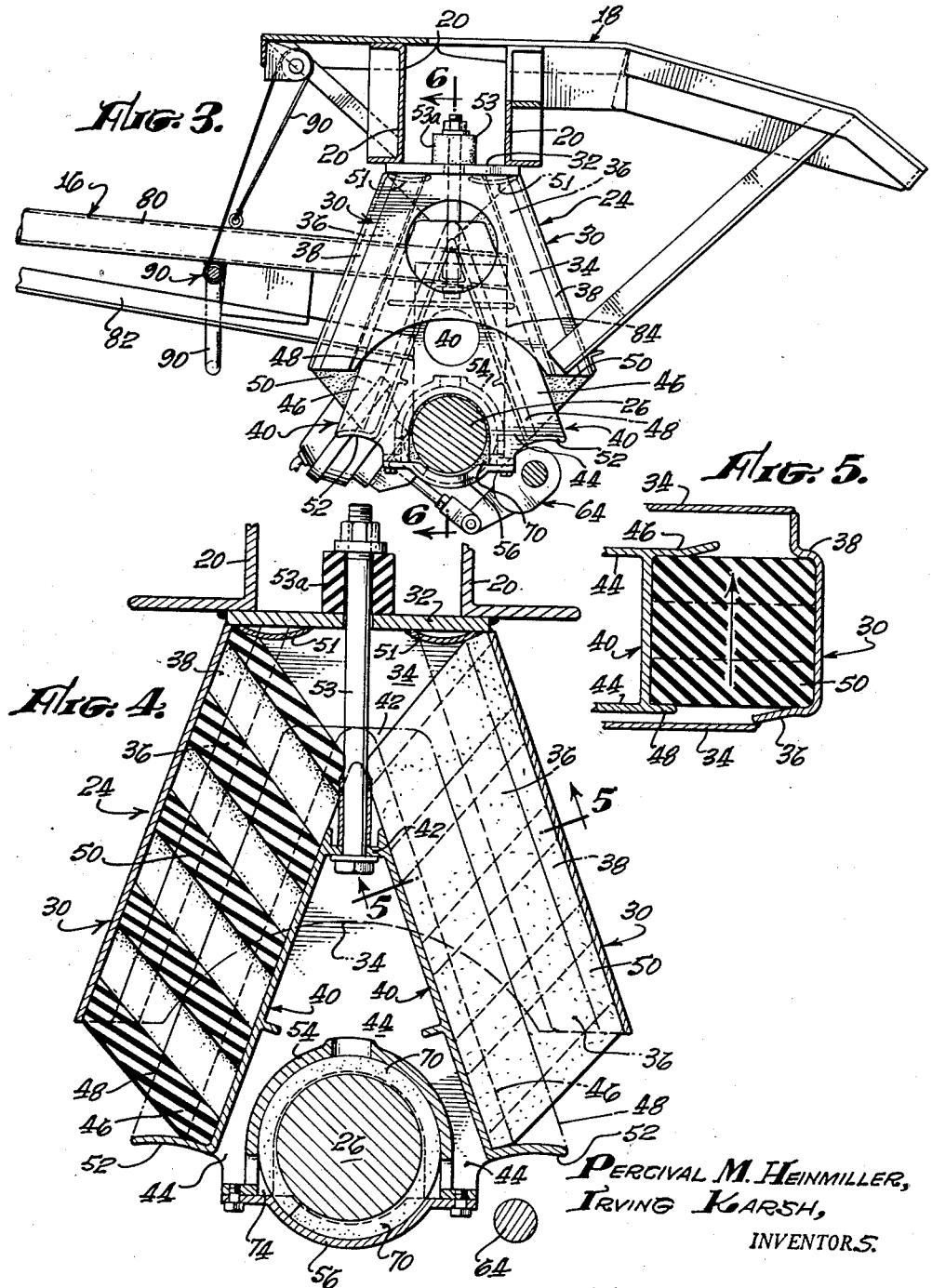

United States Patent Office 2,933,329
Patented Apr. 19, 1960

2,933,329

TOWING ASSEMBLY FOR TRAILERS

Percival M. Heinmiller, Pasadena, and Irving Karsh, Los Angeles, Calif., assignors to Utility Trailer Manufacturing Company, Puente, Calif., a corporation of California Application June 9, 1958, Serial No. 740,695

4 Claims. (Cl. 280—116)

This invention relates to improvements in the type of towing assembly shown in the co-pending application of Walter Bennett and Percival M. Heinmiller, Ser. No. 609,691, filed September 13, 1956, now Patent No. 2,872,208, issued February 3, 1959.

In that application the towing assembly, which may be used as the front dirigible running gear permanently attached to the trailer or as a converter dolly, is designed to transfer axle torque to a rigid drawbar, with the axle mounted to resiliently resist torque movement of itself and the drawbar.

The present improvements have mainly to do with the mounting of the axle and with certain freedoms of movement of the axle. The features and accomplishments of the present improvement will best be understood from the following description of preferred embodiments, with reference to the accompanying drawings, in which:

Fig. 1 is an elevation illustrating the towing assembly in use;

Fig. 2 is an enlarged half plan taken as indicated by line 2—2 on Fig. 1;

Fig. 3 is a section on line 3—3 of Fig. 2;

Fig. 4 is a further enlarged section on line 4—4 of Fig. 2;

Fig. 5 is a detail section on line 5—5 of Fig. 4; and

Fig. 6 is an enlarged section on line 6—6 of Fig. 3.

In the drawings, Fig. 1, a towing truck is indicated at 10, a four-wheeled trailer at 12, the dirigible front running gear of the trailer at 14, and the drawbar at 16. The fifth wheel that gives dirigibility about a central vertical pivot to the front running gear is indicated at 16'. As illustrated here, the lower member 18 of the fifth wheel, carried by the running gear, is designed to be disconnectible from and connectible to the upper member, so that the device is in the form of a converter dolly (see Figs. 2 and 3). But whether or not that is so, the fifth wheel structure is such as to allow the lower member 18 only a dirigible swinging movement about a vertical central axis relative to the trailer body.

As here shown, a box-like cross-beam 20 is mounted under member 18 and rigidly attached to it, each of its two ends 22 projecting laterally beyond fifth wheel member 18 to carry the suspension units 24 that are mounted on the wheel axle 26. As the two ends of beam 20, the suspension units and all the remaining structural features, are the same at both ends of the beam, the showing and description for one end suffices for both.

The suspension units 24 are similar to those set out in the copending application of Percival M. Heinmiller and Irving Karsh, Ser. No. 724,967, filed March 31, 1958.

As here shown each suspension unit comprises an outer and upper inverted V-formation consisting of two channels 30, facing each other and joined as a unit to upper member 32 which is rigidly attached, as by welding, to the under side of beam 20. The two channels are tied together by plates such as illustrated at 34. Each channel has a wide flange 36 at one edge of its web and a narrow flange 38 at the opposite edge.

Within and under that V-formation is another, made up of two channels 40, joined together at their upper ends as at 42, facing outwardly toward channels 30, and tied together by plates 44. These channels 40 also each have a wide flange 46 and a narrow flange 48, the relation of the wide and narrow flanges of the opposing outer and inner channels being shown more particularly in Fig. 5. Rubber blocks 50 are located between the two channels and confined laterally by their flanges, and may if desired be perforated as indicated in Fig. 4. They are confined vertically by upper seat formations 51 at the upper ends of outer channels 30, and 52 at the lower ends of inner channels 40. Downward movement of the outer channels under load compresses the blocks both vertically and laterally between the outer and inner channels, and also stresses them in shear between the two channels.

Upward rebound movement of the outer channels and the vehicle body is limited by the bolt 53 with a lower head under the part 42 of the lower channel formation, and an upper head bearing down on a rubber or other resilient member 53a which rests on plate 32.

Plates 44 of the inner lower V-formation carry at their lower ends a formation 54, more or less like a journal box with a detachable lower cap 56 surrounding the dead axle 26 on which the running gear wheels 58 are mounted. As indicated in Fig. 6, the wheel mounting carries brake drum 60 and the brake shoes 62 are mounted on the axle to transmit braking torque thereto. The brake operating mechanism is indicated at 64.

The journal box 54 carries a rubber sleeve 70 here shown in its preferable form of two sleeves located at opposite sides of a flange 72 secured to the axle. Each of the two sleeves 70 are confined laterally between that central flange and end flanges 74 on the journal 54. That flange confinement prevents axial displacement of the axle which might otherwise take place due to vehicular side sway. And, in that connection, the wide and narrow flanges of units 24 are arranged to minimize lateral sidesway movement between the outer V-formations 30 and the inner formations 40. In Fig. 5 the direction indicated by the arrow is the direction outward toward the adjacent end of the axle. In rounding a curve the vehicle body tends to tilt downward at its side which is outer on the curve, placing greater weight force downward on the rubber blocks 50 at that side. That action compresses the blocks vertically, putting them under pre-compression laterally. The lateral movement of the body and the upper V-formation, toward the curve outside, in the direction indicated by the arrow in Fig. 5, is then limited by the lateral resistance of the rubber blocks to further compression between the two wide flanges 36 and 46.

Rubber sleeves 70 may be press fitted into journal 54 and around axle 26, so as to exert frictional pressure on the axle and the inner face of the journal. Or, if not press fitted the vehicle weight puts the upper halves of the sleeves into such frictional pressure on the journal and axle. The axle can be rotated in the rubber-lined journal by exerting sufficient torque force on the axle; but see below.

The draft and steering tongue, indicated generally at 16, is preferably in the form of a V-frame with side members 80 and underlying brace members 82. Members 80 and 82 are rigidly attached to axle 26 by being rigidly joined to attachment members 84 which are rigidly mounted on axle 26. Any torque imposed upon the axle, to the extent that it is not absorbed by shear stress in sleeves 70, is consequently transmitted to the draw-bar and thus to the towing vehicle.

Under normal, unloaded, vehicle weight, the frictional pressure of sleeves 70 on the axle and journal is sufficient to support the draw-bar by the resilient shear stress set up in the sleeves. Under unloaded weight, or normal loaded weight, the draw-bar may be moved down from its supported position by manually exerting sufficient force on its outer end to cause slippage at the sleeves 70. To raise the draw-bar to any substantial extent above the position at which it is resiliently supported by the shear stress of the sleeves, may require some mechanistic aid, as the draw-bar itself is usually quite heavy. Consequently, to apply sufficient force to lift the draw-bar and cause sleeve slippage in that direction, it is preferred to provide a simple winch, or equivalent, indicated at 90 in Fig. 3.

It will be noted that the rubber blocks 50 also play a part in resiliently supporting the draw-bar and resiliently absorbing the braking torque that is applied to the axle via the brake shoes. Torque applied to the axle not only sets up shear stress in sleeves 70, but also tends to compress one or the other of blocks 50 when the lower, inner channels 40 tend, under torque, to rotate about the axis of the axle.

The tie plates 34 referred to above, and shown in Figs. 3 to 6 inclusive, are not claimed herein, but are included in the claimed subject matter of the application of Stephen Barker, Ser. No. 808,489, filed April 23, 1959 (of common ownership with the present application).

We claim:

1. A towing assembly for vehicles, comprising in combination a dead axle member carrying road wheels, a draw-bar substantially rigidly attached to the axle member, and structure adapted to support a vehicle body on the axle member, said structure comprising a journal formation surrounding the axle member, a sleeve of rubber-like material within the journal formation and immediately surrounding the axle member to be subjected to shear stress upon axle member rotation relative to the journal formation, and supporting means adapted to support the vehicle body on the journal formation, said supporting means comprising members in V-formation rigidly carried by the journal formation, body supporting members in V-formation opposing the first mentioned V-formation members, and blocks of rubber-like material located between the opposing V-formation members and restrained by said members against movements longitudinally and laterally relative to said members.

2. The combination defined in claim 1 and also including brake mechanism applying wheel torque to the axle member.

3. A towing assembly for vehicles, comprising in combination a fifth wheel assembly the lower member of which is limited to rotation about a substantially vertical axis, a rigid transverse beam rigidly mounted on said lower member and extending transversely therefrom at each side, a transverse dead axle member spaced below said beam, a draw-bar substantially rigidly attached to the axle member, and a pair of supporting means adapted one each to support an end portion of the rigid beam on an end portion of the axle member, each said supporting means embodying channels in V-formation mounted on the axle by a mounting adapted to transmit axle torque to said channels, beam supporting channels in V-formation opposing the first mentioned channels, and blocks of rubber-like material located between the opposing channels.

4. The combination defined in claim 3 and also including brake mechanism applying wheel torque to the axle member.

References Cited in the file of this patent
UNITED STATES PATENTS

| | | |
|---|---|---|
| 120,106 | Saladee | Oct. 17, 1871 |
| 1,939,155 | Wise | Dec. 12, 1933 |
| 2,413,212 | Brown | Dec. 24, 1946 |
| 2,752,166 | Hickman | June 26, 1956 |